United States Patent [19]
Struye et al.

[11] Patent Number: 5,371,377
[45] Date of Patent: Dec. 6, 1994

[54] METHOD OF ERASING ENERGY STORED IN A PHOTOSTIMULABLE PHOSPHOR MEDIUM

[75] Inventors: Luc Struye, Mortsel; Paul Leblans, Berchem, both of

[73] Assignee: AGFA- Gevaert, N.V., Mortsel

[21] Appl. No.: 111,904

[22] Filed: Aug. 26, 1993

[30] Foreign Application Priority Data

Sep. 7, 1992 [EP] European Pat. Off. ......... 92202697.6

[51] Int. Cl.$^5$ ................................................ G03C 5/16
[52] U.S. Cl. ..................................... 250/588; 250/581
[58] Field of Search ...................... 250/588, 581, 484.4

[56] References Cited

U.S. PATENT DOCUMENTS 5,065,021 11/1991 Arakawa ............................. 250/588

FOREIGN PATENT DOCUMENTS 2272440 11/1990 Japan .................................. 250/588

Primary Examiner—Paul M. Dzierzynski
Assistant Examiner—Richard Hanig
Attorney, Agent, or Firm—Breiner & Breiner

[57] ABSTRACT

A method of erasing energy stored in a photostimulable $Eu^{2+}$ doped alkaline earth halide phosphor medium, wherein in said method after imagewise exposure of said medium to penetrating radiation and read out of stored energy by photostimulation with light in the wavelength range of 430 to 550 nm, said phosphor medium is exposed in a single erasure step with light mainly within the 370 to 530 nm range containing two distinct or separate emission bands, one of which is peaking at or near 400 nm and the other at or near 500 nm.

13 Claims, 7 Drawing Sheets

METHOD OF ERASING ENERGY STORED IN A PHOTOSTIMULABLE PHOSPHOR MEDIUM

DESCRIPTION

1. Field of the Invention

The present invention relates to a method and apparatus for erasing a radiation image remaining on a stimulable phosphor medium after the stimulable phosphor medium has been exposed to stimulating rays for reading out the energy of a penetrating radiation image stored therein.

2. Background of the Invention

In radiography the interior of objects is reproduced by means of penetrating radiation, which is high energy radiation also known as ionizing radiation belonging to the class of X-rays, gamma-rays and high-energy elementary particle radiation, e.g. beta-rays, electron beam or neutron radiation. In classical radiography using silver halide emulsion film between phosphor screens that convert penetrating radiation into visible light and/or ultraviolet radiation the applied phosphors are characterized by high "prompt" emission when struck by X-rays.

More recently as described e.g. in U.S. Pat. No. 3,175,084 a radiological device and process operates with a phosphor screen wherein the energy of penetrating radiation is stored and read out in the form of fluorescent light by means of stimulating radiation. In an embodiment of the invertion described in said US-P an optically clear crystalline wafer of stimulable phosphor material is subjected to X-ray radiation and becomes sensitive to radiation within the infrared and visible wavelength range.

From said US-P specification can be learned that from a theoretical standpoint the excitation of the crystalline phosphor material generates electrons and positive holes which become trapped and form phosphorescent centers. Irradiation of such "pumped" crystals with infrared or visible light causes a release of the stored energy in the form of light or higher frequency as a result of electron-hole recombination.

The photostimulable storage phosphor material mentioned in U.S. Pat. No. 3,175,084 is taken from the group consisting of the alkali metal halides arid alkaline earth halides and includes an impurity element from Groups I, II or III in the Periodic Table of Elements. The impurity element determines largely the luminescent characteristics of the phosphor.

In U.S. Pat. No. 3,859,527 a method for recording penetrating radiation images is described wherein as temporary storage medium a screen containing an infrared stimulable phosphor is used. A time interval after exposure to penetrating radiation such as X-rays, a small beam of long wavelength radiation scans the screen to release the stored energy as light. An appropriate sensor receives the fluorescent light emitted by the phosphor in the screen and produces electrical energy in accordance with the fluorescent light. The information carried by the electrical energy is transformed into a recorded image by scanning an information storage medium with a light beam which is intensity modulated in accordance with the electrical energy.

According to the periodical Radiology, September 1983, p. 833 to 838 the basic constituents of an X-ray imaging system operating with a photostimulable storage phosphor are (1) a photostimulable imaging sensor containing said phosphor in particulate form normally in a panel also called phosphor screen which temporarily stores the X-ray energy pattern, (2) a scanning laser beam for photostimulating the pattern-wise X-ray exposed phosphor screen, and (3) a light guide member for collecting and guiding the fluorescent light produced on photostimulation into (4) a photoelectronic detector. The photoelectronic light detector provides analogue signals that are converted subsequently into digital time-series signals with a digital image processor whereupon the signals are stored digitally in an electric signal recorder, e.g. magnetic disk or tape.

The stored electronic signals forming a representation of the X-ray energy pattern can be used to modulate the light exposure of a photographic film or are visualized on an electronic signal display unit, e.g. cathode-ray tube.

Photostimulation is carried out preferably with easily controllable monochromatic light of lasers and therefore storage phosphors are preferred that are photostimulable in the wavelength range of 440 to 1100 nm with an emission of stimulated light at wavelength(s) still sufficiently different from the wavelength of the stimulating light to allow efficient separation by optical filter means.

In view of economy, it is preferred that the stimulable phosphor screen be repeatedly reused. The reuse of the stimulable phosphor screen is possible when tile previously stored radiation image is erased sufficiently.

When recording an image by read-out scanning a phosphor panel exposed to penetrating radiation less than 90% of the stored energy is released. Thus there arises a problem that, when the stimulating phosphor sheet is reused, part of the radiation energy still stored on the stimulable phosphor sheet can interfere as a kind of noise with the radiation image recorded in a subsequent radiation image recording step.

According to U.S. Pat. No. 3,859,527 (column 4, lines 5-7) the phosphor can be reduced to a neutral state by simple expedients such as brief, uniform illumination, irradiation or heating.

As described in the book "An Introduction to Luminescence of Solids" by Humboldt W. Leverenz (Radio Corporation of America—RCA Laboratories Division Princeton, N.J.) John Wile & Sons, Inc. New York (1950), pg. 415: "The stimulable phosphors provide a practically invisible record, lasting many months, which may be brought out periodically by irradiation with long-wave photons, (for example infra-red), and may be erased (quenched) by photons with wavelengths lying between the emission and stimulation bands (for example, orange light when the phosphor is infrared light stimulable—compare FIG. 26a)"

It is obvious that the erasure of stored energy may proceed with light having a wavelength within the wavelength range of the photostimulation spectrum of the applied phosphor but from the above mentioned Leverenz reference (pages 181-182, FIG. 26a and 26b) can be learned that emission of Fluorescent light from infrared-stimulable phosphors, e.g. cub. $Sr(S:Se):SrSO_4:CaF_2:Sm:Eu$ can proceed not only with infrared light but even more advantageously can be carried out with orange light (600 to 650 nm) having wavelengths shorter than the infrared photostimulating light.

The chemical structure of the storage phosphor will determine its photostimulation spectrum and wavelength range wherein erasure (quenching) of stored energy will take place efficiently. Such explains that an europium doped barium fluorobromide phosphor as described in U.S. Pat. No. 4,239,968 and having a stimulation spectrum with a maximum near 600 nm as presented in FIG. 3 of said U.S. Pat. No. can obviously be erased with light having a wavelength within the range of 400 nm to 600 nm using a light source emitting mainly in said wavelength range. As described in U.S. Pat. No. 4,496,838 suitable known erasure light sources emitting mainly in said wavelength range are a fluorescent lamp, a laser source, a sodium lamp, a neon lamp, a metal halide lamp or a xenon lamp.

From U.S. Pat. No. 5,056,021 can be learned that when erasure is effected by the use of erasure light containing therein no ultraviolet light, radiation energy stored in a storage phosphor in the form of relatively deep trapped electrons cannot be released. Such has disadvantageous consequences in that following erasure, a redistribution of the still trapped electrons takes place, whereby electrons diffuse From the deeper traps into less deep traps that can be stimulated by the laser light of the scanning unit, thus causing re-appearance of the erased X-ray image on the storage phosphor plate. From said U.S. Pat. No. 5,065,021 can further be learned that it is very difficult to release both the radiation energy in the form of deep trapped electrons and the radiation energy in the form of normal trapped electrons at one time and effectively release the remaining radiation energy.

The solution presented in U.S. Pat. No. 5,056,021 is to use an erasure unit comprised of two separate light sources the first of which emits light in the ultraviolet (UV) wavelength range and the second of which emits light in the visible range of the spectrum. It is believed that the UV emitting light source releases remaining radiation energy in the form of deep trapped electrons in addition to remaining radiation energy in the form of normal trapped electrons, but also produces other trapped electrons. The second light source is needed to release those newly trapped electrons.

The use of a first and second erasure step has been described already in U.S. Pat. No. 4,439,682 wherein the second erasure is applied immediately before the phosphor is used for its next radiographic operation. Such has been found necessary since experiments have shown that the already erased phosphor regains with time some photostimulable energy that can interfere with the energy pattern obtained in a next radiographic operation. This phenomenon being called here the "rebounce effect" will be a cause of noise resulting in image distortion.

It has been found experimentally by us that the wavelength at which optimal erasure takes place is dependent on the wavelength of the applied photostimulation light in the read out step.

For example the erasure of energy stored in a BaFBr:$Eu^{2+}$ phosphor being carried out with photostimulation light of argon ion laser (488 nm and/or 514.5 nm) proceeds most effectively with erasure light situated in the 480 to 500 nm range, whereas the erasure of energy stored in said phosphor being read out with photostimulation light of a helium-neon laser (633 nm) proceeds most effectively with erasure light situated mainly in the 500 to 560 nm range.

It would be advantageous if the erasure could be done in a single erasure step without creating additional traps also preventing a rebounce effect detrimental to image quality. A pronounced rebounce effect is particularly disturbing when a penetrating radiation image is made with a higher exposure and is followed in a next radiographic operation by the production of an image made with a relatively weak exposure.

OBJECTS AND SUMMARY OF THE INVENTION

It is an object of the present invention to provide a radiographic method wherein a photostimulable phosphor is freed effectively in a single erasure step from stored energy after its read-out-photostimulation and wherein said erasure is followed by an insignificant rebounce phenomenon.

It is a further object of the present invention to provide an apparatus by means of which said radiographic procedure can be carried out.

Other objects and advantages of the present invention will appear from the following description and drawings.

In accordance with the present invention a method of erasing energy stored in a medium containing a photostimulable $Eu^{2+}$ doped alkaline earth halide phosphor medium is provided, wherein in said method after imagewise exposure of said medium to penetrating radiation and read out of stored energy by photostimulation with light in the wavelength range of 430 to 550 nm, said phosphor medium is exposed in a single erasure step with light mainly within the 370 to 530 nm range containing two distinct or separate emission bands, one of which is peaking at or near 400 nm and the other at or near 500 nm.

By the selection of bichromatic erasure light characterized by substantially equienergetic exposure at 410 nm and 480 nm of an $Eu^{2+}$ doped alkaline earth fluorohalide phosphor the residual energy is removed effectively without creating in said phosphor additional traps and with the prevention of a rebounce detrimental to image quality.

Further in accordance with the present invention an apparatus for recording and reproducing a pattern of penetrating radiation comprises:

(1) a recording and storage means containing a photostimulable storage phosphor of the class of $Eu^{2+}$ doped alkaline earth metal fluorohalides capable of storing energy when struck by said penetrating radiation, (2) a read out means for generating stimulating rays in the wavelength range of 430 nm to 550 nm to which said photostimulable phosphor after storing therein the energy of said penetrating radiation is exposed, (3) a detection means for detecting the fluorescent light emitted from the photostimulable phosphor by irradiation with said stimulating rays, and (4) an erasure means for erasing energy left in said phosphor after said detection, wherein said means is a light source or plurality of light sources capable of emitting light mainly within the 370 to 530 nm range containing two distinct or separate emission bands, one of which is peaking at or near 400 nm and the other at or near 500 nm.

DETAILED DESCRIPTION OF THE INVENTION

According to a preferred embodiment the erasure proceeds with light in the 370 to 530 nm range being composed such that the ultraviolet light emitted in the 370-400 nm range represents less than 50% of the energy emitted as visible light in the 400-500 nm range.

A preferred erasure means for application according to the present invention contains an ultraviolet stimulable fluorescent means in conjunction with an ultraviolet radiation emitting means. Fluorescent light sources have a relatively efficient light emission with very low heat production so that cooling can be omitted.

In a preferred embodiment said erasure means is a supported phosphor coating containing at least one phosphor emitting fluorescent light when struck with ultraviolet radiation. The support of said phosphor coating is e.g. a glass sheet or panel, and the ultraviolet radiation emitting means is one or more high pressure mercury vapor tubes. Apart from glass any support transparent to the Fluorescent light of the UV-stimulable phosphor(s) may be used with the proviso that the ultraviolet radiation after striking the UV-stimulable phosphor(s) is cut off sufficiently, e.g. with separate UV-filter, in order to avoid an undesirable formation of additional traps in the photostimulable storage phosphor.

In an erasure station containing said supported fluorescent coating the ultraviolet radiation emitting means faces said phosphor coating and the recording and storage means containing a photostimulable storage phosphor of the class of $Eu^{2+}$ doped alkaline earth metal fluorohalides capable of storing energy when struck by penetrating radiation in the erasure stage is directed to and arranged at a small distance from said ultraviolet radiation absorbing support.

A reflector means in the form of an ultraviolet radiation reflecting mirror will increase the amount of ultraviolet radiation striking the UV-stimulable fluorescent phosphor coating in which the phosphor(s) may be present in an organic binder or inorganic cement.

Figure 1:
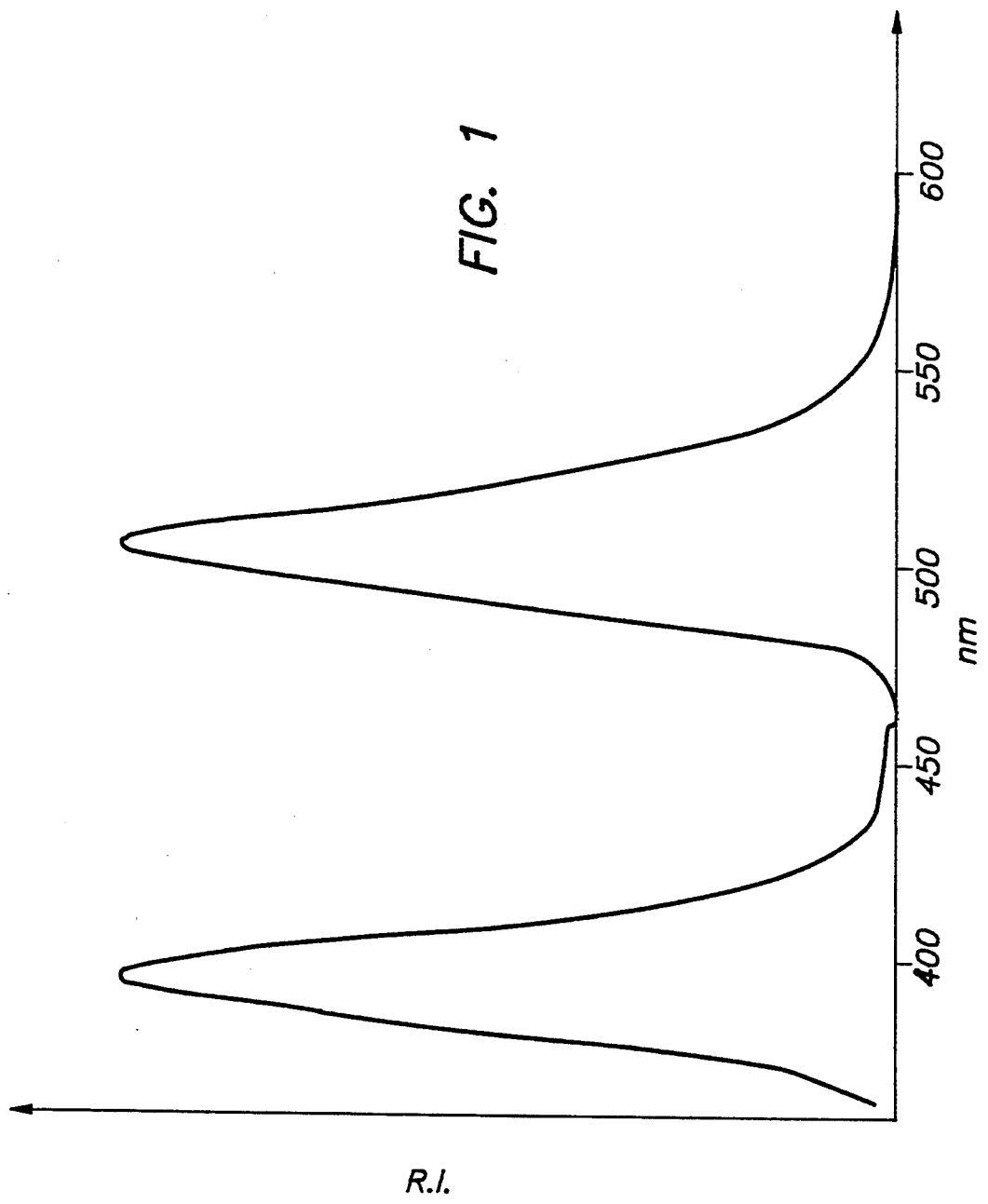
FIG. 1 represents the emission spectrum [relative emission intensity (R.I.) versus wavelength (nm) of a fluorescent light source applied for erasure purposes according to the present invention.

In FIG. 1 the fluorescent light emission spectrum [relative emission energy (R.E.) in the ordinate versus wavelength (nm) in the abscissa] is given of a (50/50 by weight) mixture of two commercially available fluorescent lamp phosphors, viz. $Sr_{0.8}Mg_{1.2}P_2O_7$:Eu and $MgOGa_2O_3$:Mn particularly suited for use in the method according to the present invention for the production of bichromatic erasure light when stimulated by ultraviolet radiation. From said emission spectrum, more particularly on comparing the surface comprised under the emission peaks, can be learned that the intensity ratio of the light having a wavelength of about 400 nm and of a wavelength of about 500 nm is almost 1. The emission peaks beyond 500 nm may be cut off by a proper filter although such is not strictly necessary since the wavelengths beyond 500 nm do not materially add to the erasure effect. The emission spectrum of said fluorescent coating is such that the energy emitted as ultraviolet light in the 370-400 nm range is less than 50% of the energy emitted as visible light in the 400-500 nm range and will not create a substantial amount of additional traps to be emptied.

Other suitable bichromatic erasure light emitting phosphor combinations can be made in replacing $Sr_{0.8}Mg_{1.2}P_2O_7$:Eu by $Sr_3(PO_4)_2$:$Eu^{2+}$; $Sr_2P_2O_7$:$Eu^{2+}$ or $SrAl_{12}O_{19}$:$Eu^{2+}$ and by replacing $MgOGa_2O_3Mn$ by $Ba_2P_2O_7$:Ti; $Ca_5F(PO_4)_3$:Sb; $Sr_5F(PO_4)_3$:Sb; $MgWO_4$:W; $BaMg_2Al_{16}O_{27}$:Eu,Mn; $Sr_4Al_{14}O_{25}$:Eu; $Sr_2MgSi_2O_7$:Eu; $Ba_2MgSi_2O_7$:Eu or $BaAl_2O_4$:$Eu^{2+}$.

Good erasure results in the erasure method according to the present invention are obtained when using as photostimulable storage phosphor an europium(II)-doped barium fluorohalide phosphor as described e.g. in U.S. Pat. No. 4,239,968. Particularly good results are obtained with europium(II)-doped barium fluorohalide phosphors in which barium is partly replaced by strontium and fluorine is present in excess over the other halide(s) as described e.g. in published European patent applications (EP-A) 0345 903 and 0345 904, and in published European patent application No. 0 533 233 filed 17th September 1991. In the latter EP application photostimulable phosphors are described having the following empirical formula:

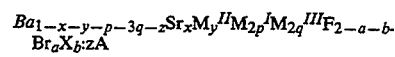

$$Ba_{1-x-y-p-3q-z}Sr_xM_y^{II}M_{2p}^{I}M_{2q}^{III}F_{2-a-b-}Br_aX_b\text{:}zA$$

wherein:

X is at least one halogen selected from the group consisting of Cl and I, $M^I$ is at least one alkali metal selected from the group consisting of Li Na, K, Rb and Cs;

$M^{II}$ is at least one alkaline earth metal selected from the group consisting of Ca and Mg;

$M^{III}$ is at least one metal selected from the group consisting of Al, Ga,

In, Tl, Sb, Bi, Y or a trivalent lanthanide, e.g. La, Ce, Pr, Nd, Sm, Gd, Tb, Dy, Ho, Er, Tm, Yb and Lu;

a is a number satisfying the conditions of $0.85 \leq a \leq 0.96$ when x is $0.17 \leq x \leq 0.55$ and $0.90 \leq a \leq 0.96$ when x is $0.12 \leq x \leq 0.17$;

y is in the range $0 \leq y \leq 0.10$;

b is in the range $0 \leq b \leq 0.15$;

p is in the range $0 \leq p \leq 0.3$;

q is in the range $0 \leq q \leq 0.1$;

z is in the range $10^{-6} \leq z \leq 10^{-2}$, and

A is $Eu^{2+}$.

In the latter phosphors these doped with Li are particularly useful in photostimulation with argon ion laser emitting at 514.5 or 488 nm.

For illustrative purposes the preparation of phosphors I and II used in the following EXAMPLES are given hereinafter.

PREPARATION OF PHOSPHOR I

A raw mix was prepared with the empirical composition:

$Ba_{0.858}Sr_{0.141}Eu_{0.001}F_{1.0147}Br_{0.9853}$ starting from $BaF_2$, $SrF_2$, $NH_4Br$ and $EuF_3$. One kg of this raw mix was prepared and blended in a V-blender.

To prepare phosphor I 30 g of the above defined raw mix were fired as such. A first firing was performed in a box furnace at 850° C. during 160 minutes. The crucible containing the sample was placed in a larger crucible containing carbon and water to produce a reducing atmosphere. After grinding, the sample was fired for a second time in a tube furnace at 830° C. for 3 hours in a 99.8 vol % $N_2$—0.2 vol % $H_2$ atmosphere. After cooling the phosphor sample was reground.

Figure 6:
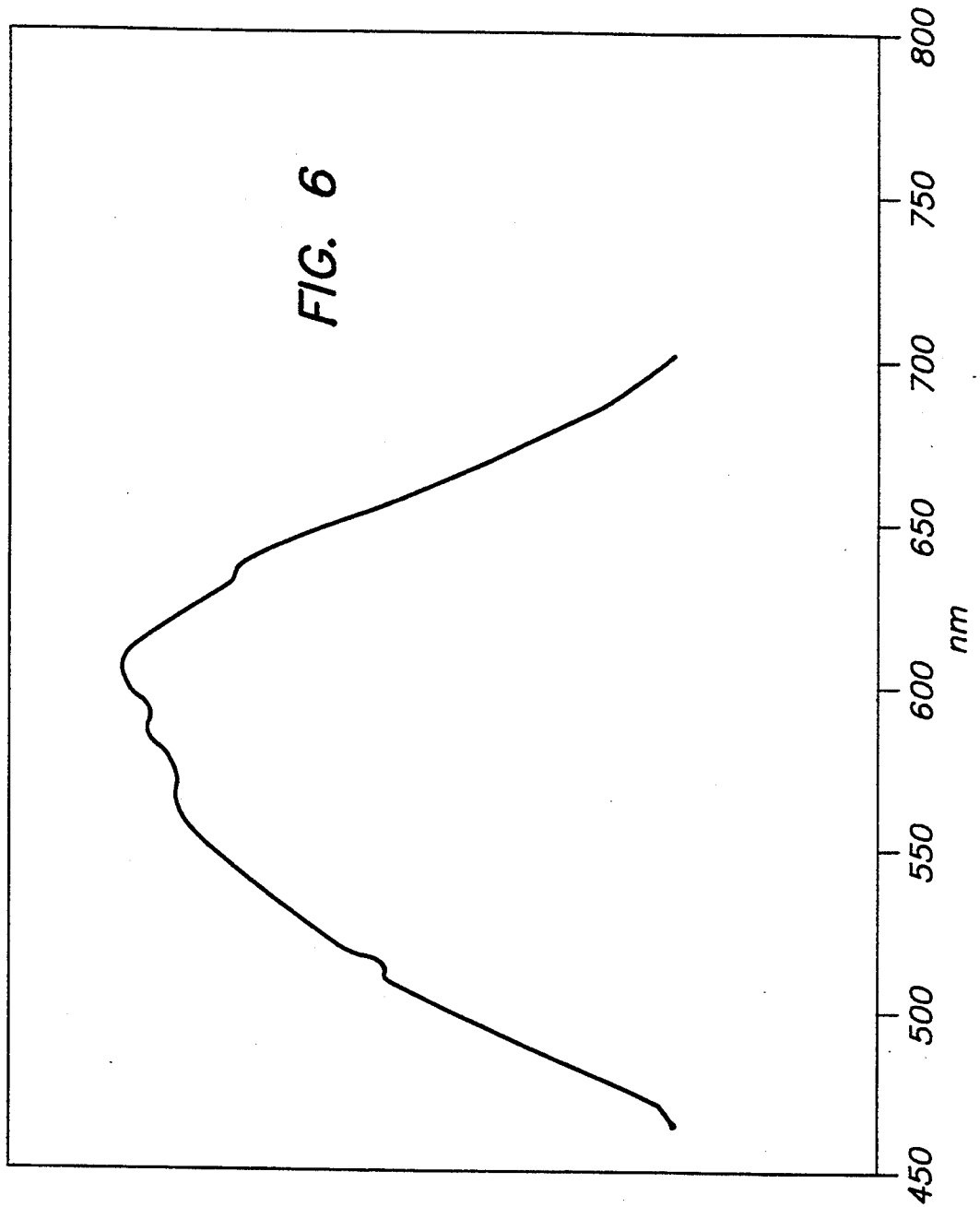
FIG. 6 represents the stimulation spectrum of the phosphor having the erasure spectrum and rebounce curves as shown in FIG. 2 and 3 repectively.

The stimulation spectrum [relative emission intensity (R.I.Es) versus wavelength (nm) of the stimulating light]of phosphor I is given in the accompanying FIG. 6.

PREPARATION OF PHOSPHOR II

In the preparation of the phosphor II the procedure given for phosphor I was repeated with the proviso that 0.1 wt % of $Li_2CO_3$ was mixed thoroughly with the raw mix prior to the first firing.

Figure 7:
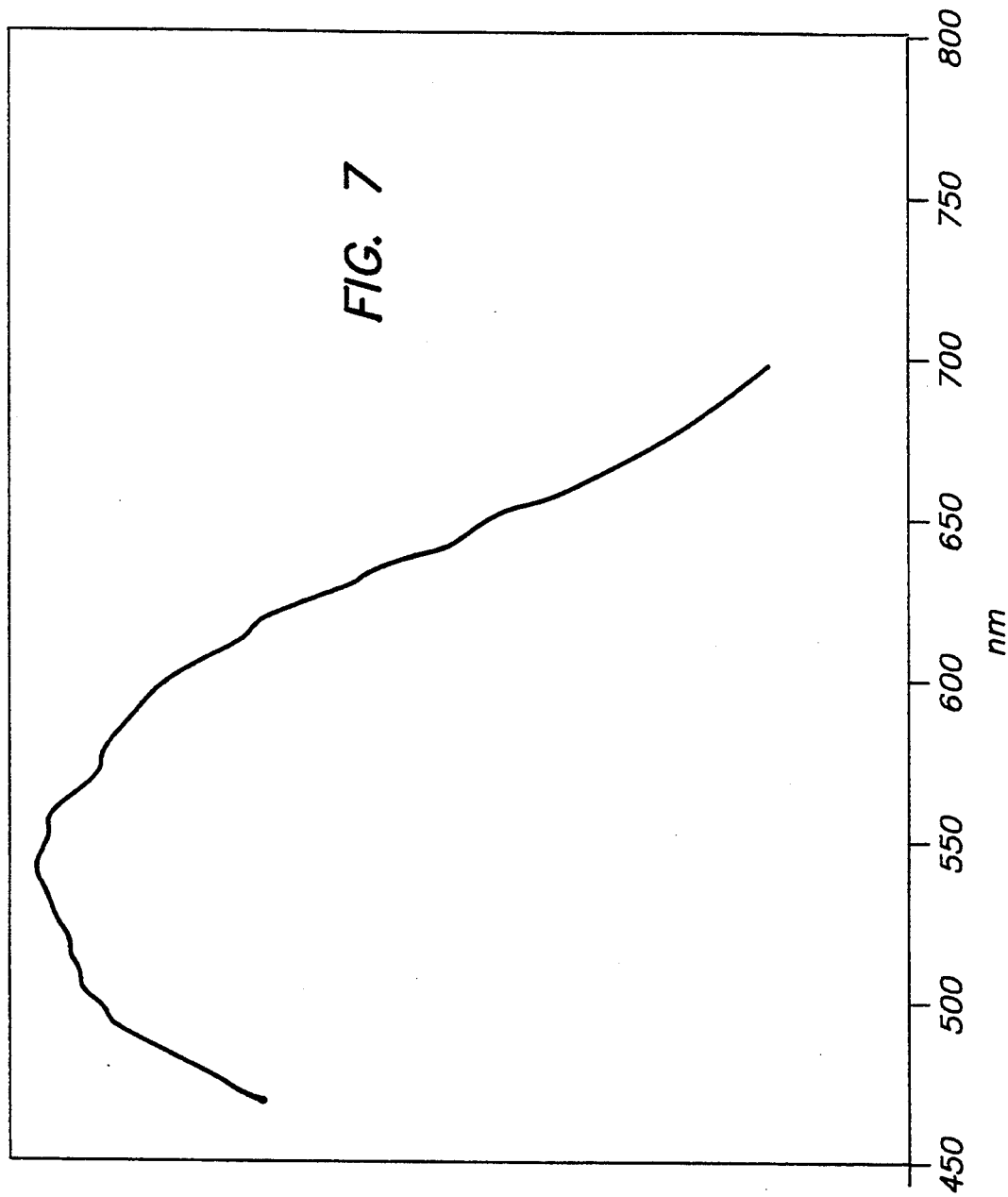
FIG. 7 represents the stimulation spectrum of the phosphor having the erasure spectrum and rebounce curves as shown in FIG. 4 and 5 repectively.

The stimulation spectrum [relative emission intensity (R.I.Es) versus wavelength (nm) of the stimulating light]of phosphor II is given in the accompanying FIG. 7.

For the determination of the stimulation spectrum the light of a tungsten (quartz-iodine) lamp is fed into a monochromator (Bausch and Lomb—Germany) and then mechanically chopped with a rotating wheel with a single hole. The lamp provides a continuous spectrum extending from the near UV through the visible spectrum into the infrared. The 33-86-02 grating from Bausch and Lomb is a 1350 line/mm grating covering the visible range from 350 nm to 800 nm in the first order and is blazed at 500 nm. The wavelength of the stimulating light can be set via a step motor connected to the monochromator under the control of a computer. The second harmonic of the monochromator is eliminated by placing a 4 mm Schott GG435 filter in front of the phosphor screen. By chopping the stimulating light (duty cycle 1/200) only a small fraction of the absorbed energy in the phosphor is released. Only the AC signal is measured to eliminate the offset caused by e.g. the dark current of the photomultiplier. A good signal to noise ratio is obtained by averaging several pulses. Upon completing the measurement the computer corrects the curve for the intensity wavelength dependence of the tungsten lamp. The measurement can be repeated so that the evolution of the stimulation spectrum can be followed over a period of up to 15 hours.

The recording and storage medium containing the stimulable phosphor is not necessarily a sheet that can be transported e.g. in a cassette, but may be used in various forms, e.g. in the form of a web, an endless belt, drum or in the form of a self-supporting panel.

The present invention is illustrated in the following examples 1 and 2 including comparative tests carried out on phosphors I and II prepared according to the above described procedures.

EXAMPLE 1

Phosphor I was applied at a coverage of 1000 g/m² in a cellulose acetate/butyrate binder to form a solid layer on a polyethylene terephthalate support forming thereby a photostimulable phosphor sheet.

Before being exposed to X-rays said sheet was erased to such an extent that upon photostimulation with 488 nm argon ion laser light no signal was measured in the highest sensitivity mode of the detector.

The thus treated sample was exposed to an X-ray dose of 600 mR. The X-ray source with tungsten anode was operated at 80 kV, an aluminum filter of 21 mm being arranged in the X-ray beam in order to obtain an X-ray beam as used in medical radiography for bone structure analysis.

In order to determine the wavelength dependent erasability of the thus X-ray exposed phosphor sample a xenon lamp provided with a series of interference filters was used to select monochromatic rays at an increment of 10 nm. Ultraviolet light was filtered out with a glass filter (3 mm) type GG400 of SCHOTT, The Netherlands. The erasure time was chosen in such a way that the erasing energy was equal for all wavelengths. For this purpose the intensity of the erasing light was measured with a radiometer as a function of wavelength. Subsequently, the amplitude was measured of the emission signal produced upon photostimulation with argon ion laser light (488 nm) of the phosphor sheet previously erased with monochromatic light obtained from the xenon lamp provided with a selected interference filter. The detection of the signal s proceeded with a phototube connected to a digital oscilloscope on which the signal amplitude can be read. The erasure results are illustrated in FIG. 2.

Figure 2:
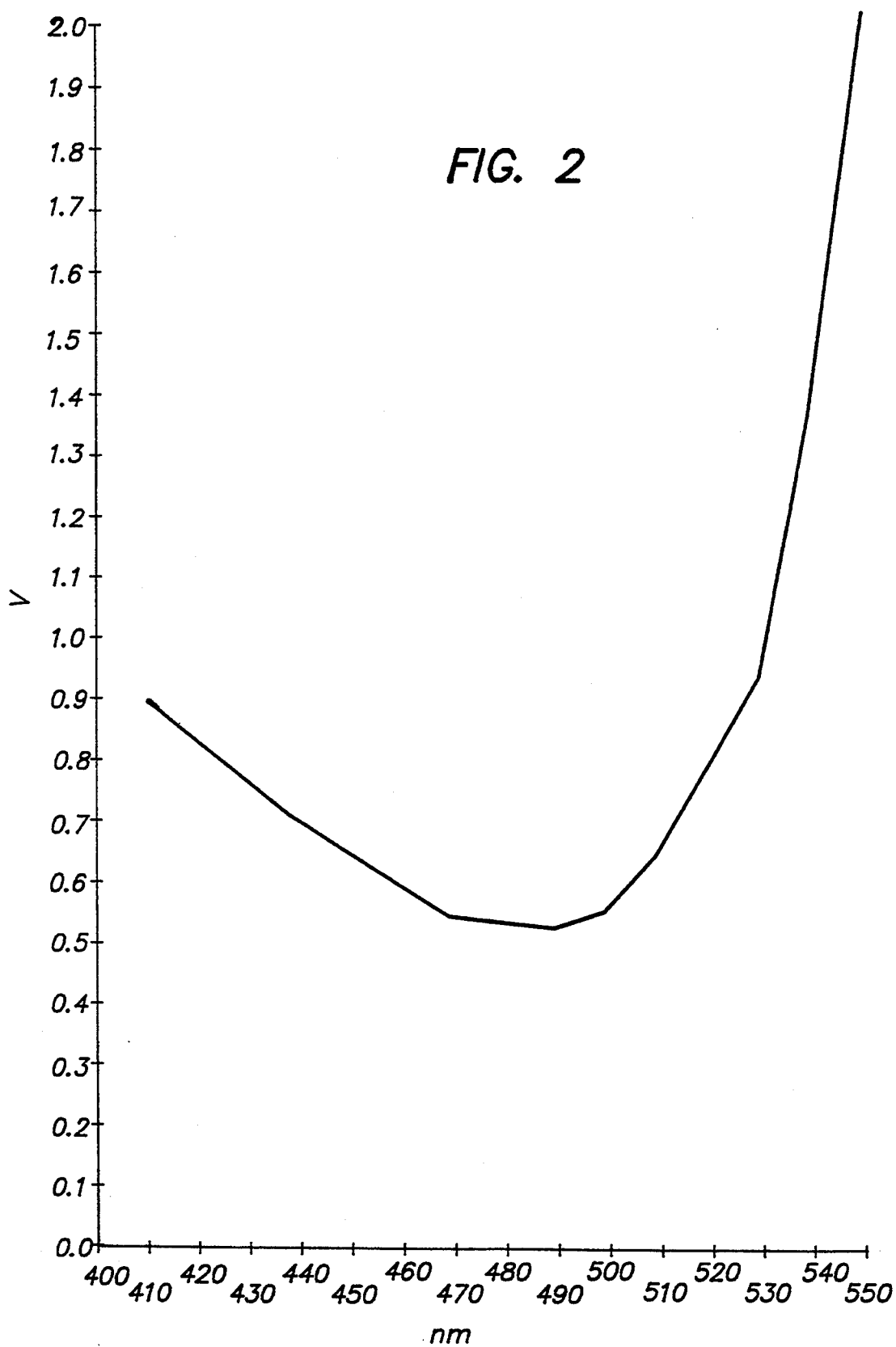
FIG. 2 and 4 each represent the erasure spectrum of X-ray exposed $Eu^{2+}$ doped alkaline earth halide phosphors (respectively undoped and doped with Li) that have been scanned with 488 nm light after their monochromatic erasures. The amplitude (V) of photostimulated emission signal (phototube output-voltage) obtained after equal X-ray exposure and erasure with monochromatic erasure light is plotted in the ordinate versus the wavelength (nm) of the monochromatic erasure light used in the abscissa.

FIG. 2 shows that when a read-out following one of the wavelength selected erasures proceeds with laser light of 488 nm wavelength very effective erasure is obtained with light in the range of 410 to 520 nm although the maximum in the stimulation spectrum of the phosphor is at about 600 nm.

In another experiment the rate of build-up of the photostimulable signal after erasure was measured as a function of time for different wavelength(s) of the erasure light.

The phosphor screen was exposed to X-rays and then subjected to erasure of the stored energy with 550 nm light, 500 nm light or a combination of 410 nm and 480 nm light according to the present invention. Then, the amplitude of the photostimulable signal was measured upon stimulation with 488 nm argon ion laser light for different times after erasure exposure. A fresh sample was used for every time difference between erasure and measurement of the signal amplitude.

Figure 3:
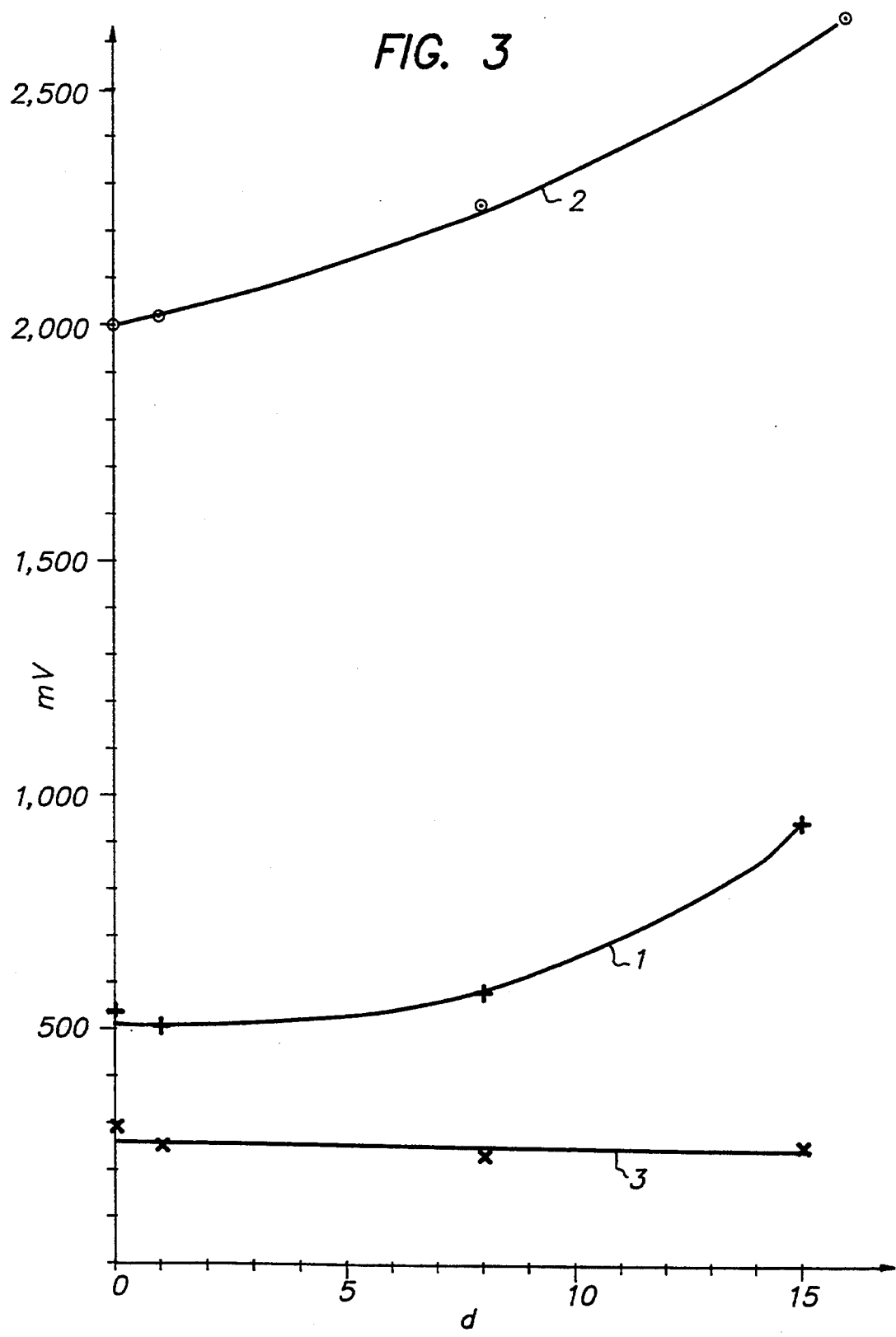
FIG. 3 represents different graphs (called rebounce curves) related to the extent of rebounce of the same X-ray exposed $Eu^{2+}$ doped alkaline earth halide phosphor after using in the erasure 500 nm light, 550 nm light and bichromatic light (410 and 480 nm) respectively. The erasure has been performed with equal energy in every experiment. The amplitude (mV) of the photostimulated emission signal obtained by read out with 488 nm argon ion laser light is plotted in the ordinate whereas the time in days (d) following the respective erasures is plotted in the abscissa.

FIG. 3 represents graphs 1, 2 and 3 wherein the rebounce effect is demonstrated in the form of a regained signal voltage (mV) over a period expressed in days (d) following erasure exposures different in wavelength at same erasure energy, viz. with monochromatic 500 nm (graph 1), 550 nm (graph 2) and a combination of 410 and 480 nm light (graph 3) respectively. The 500 nm and 550 nm erasure exposures were carried out each with an energy striking the phosphor sample of 20 mJ/cm$^2$. The simultaneous erasure exposure with 410 nm and 480 nm light proceeded with an energy of 10 mJ/cm$^2$ for each of said wavelengths.

The more effective erasure and the reduction in rebounce effect by applying the equienergetic bichromatic erasure exposure with respectively 410 and 480 nm erasure light according to an embodiment of the present invention can be clearly distinguished in comparing graph 3 with graphs 1 and 2.

EXAMPLE 2

Example 1 was repeated with the proviso however that Phosphor II was applied at a same coverage.

Figure 4:
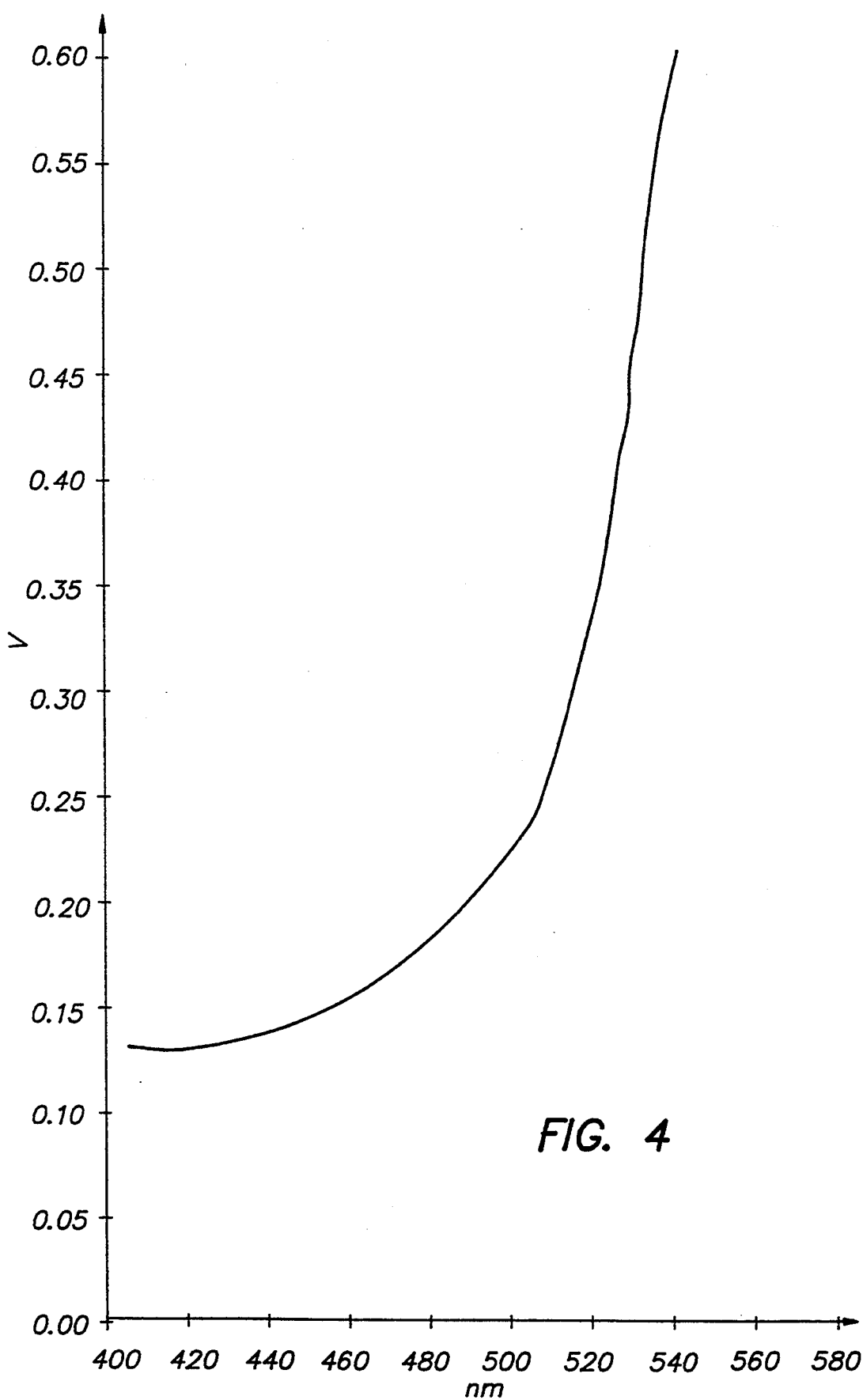
Figure 5:
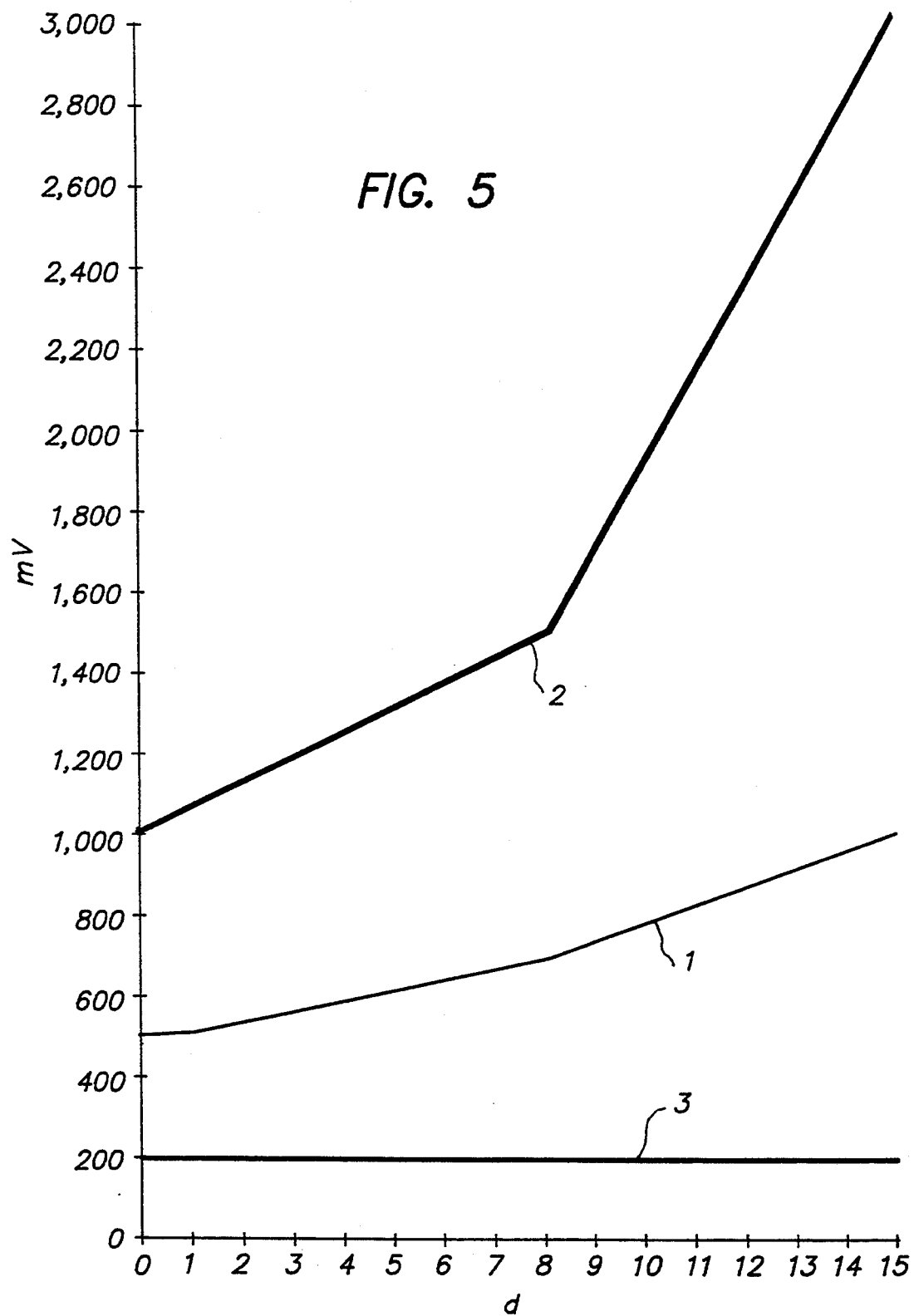
FIG. 5 represents rebounce curves related to another $Eu^{2+}$ doped alkaline earth halide phosphor (containing Li as codopant) after using in the erasure 500 nm light, 550 nm light and bichromatic light (410 and 480 nm) respectively.

The erasure spectrum and rebounce curves are shown in FIG. 4 and 5.

FIG. 4 shows that when a read-out following one of the wavelength selected erasures proceeds with laser light of 488 nm wavelength very effective erasure is obtained with light in the range of 400 to 520 nm although the maximum in the stimulation spectrum of the phosphor is at about 525 nm.

FIG. 5 represents graphs 1, 2 and 3 wherein the rebounce effect is demonstrated in the form of a regained signal voltage (mV) over a period expressed in days (d) following erasure exposures different in wavelength at same erasure energy, viz. with monochromatic 500 nm (graph 1), 550 nm (graph 2) and a combination of 410 and 480 nm light (graph 3) respectively. The 500 nm and 550 nm erasure exposures were carried out each with an energy striking the phosphor sample of 20 mJ/cm$^2$. The simultaneous erasure exposure with 410 nm and 480 nm light proceeded with an energy of 10 mJ/cm$^2$ for each of said wavelengths.

The more effective erasure and the reduction in rebounce effect by applying the equienergetic bichromatic erasure exposure with respectively 410 and 480 nm erasure light according to an embodiment of the present invention can be clearly distinguished in comparing graph 3 with graphs 1 and 2.

We claim:

1. A method of erasing energy stored in a medium containing a photostimulable Eu$^{2+}$ doped alkaline earth halide phosphor, wherein in said method after imagewise exposure of said phosphor to penetrating radiation and read out of stored energy by photostimulation with light in the wavelength range of 430 to 550 nm, said phosphor for its erasure is exposed in a single erasure step with light mainly within the 370 to 530 nm range containing two distinct or separate emission bands, one of which is peaking at or near 400 nm and the other at or near 500 nm.

2. Method according to claim 1, wherein the erasure proceeds with said light in the 370 to 530 nm range being composed such that the ultraviolet light emitted in the 370-400 nm range is less than 50% of the energy emitted as visible light in the 400-500 nm range.

3. Method according to claim 1, wherein the erasure proceeds with an erasure source containing an ultraviolet-stimulable fluorescent means in conjunction with an ultraviolet radiation emitting means.

4. Method according to claim 3, wherein said fluorescent means is a supported phosphor coating containing at least one phosphor emitting fluorescent light when struck with ultraviolet radiation.

5. Method according to claim 3, wherein said ultraviolet radiation emitting means is one or more high pressure mercury vapor lamps.

6. Method according to claim 1, wherein the erasure proceeds with fluorescent light emitted by a mixture of two fluorescent lamp phosphors corresponding respectively to the following empirical formulae:

$Sr_{0.8}Mg_{1.2}P_2O_7$:Eu and $MgOGa_2O_3$:Mn.

7. Method according to claim 1, wherein the erasure proceeds with fluorescent light having an emission spectrum as shown in FIG. 1.

8. Method according to claim 1, wherein said Eu$^{2+}$ doped alkaline earth halide phosphor is an europium-(II)-barium fluorohalide phosphor in which barium is partly replaced by strontium and fluorine is present in excess over the other halide(s).

9. Method according to claim 1, wherein said phosphor corresponds to the following empirical formula:

$Ba_{1-x-y-p-3q-z}Sr_xM_y^{II}M_{2p}^{I}M_{2q}^{III}F_{2-a-b}Br_aX_b$:zA wherein:

X is at 1east one halogen selected from the group consisting of Cl and I;

$M^I$ is at least one alkali metal selected from the group consisting of Li Na, K, Rb and Cs;

$M^{II}$ is at least one alkaline earth metal selected from the group consisting of Ca and Mg;

$M^{III}$ is at least one metal selected from the group consisting of Al, Ga, In, Tl, Sb, Bi, Y or a trivalent lanthanide, e.g. La, Ce, Pr, Nd, Sm, Gd, Tb, Dy, Ho, Er, Tm, Yb and Lu;

a is a number satisfying the conditions of $0.85 \leq a \leq 0.96$ when x is $0.17 \leq x \leq 0.55$ and $0.90 \leq a \leq 0.96$ when x is $0.12 \leq x \leq 0.17$;

y is in the range $0 \leq y \leq 0.10$;

b is in the range $0 \leq b \leq 0.15$;

p is in the range $0 \leq p \leq 0.3$;

q is in the range $0 \leq q \leq 0.1$;

z is in the range $10^{-6} \leq z \leq 10^{-2}$, and

A is Eu$^{2+}$.

10. Method according to claim 1, wherein said read out proceeds with argon ion laser light of 488 nm.

11. An apparatus for recording and reproducing a pattern of penetrating radiation, which apparatus comprises:

(1) a recording and storage means containing a photostimulable storage phosphor of the Eu$^{2+}$ doped alkaline earth metal fluorohalides capable of storing energy when struck by said penetrating radiation, (2) a read out means for generating stimulating rays in the wavelength range of 430 nm to 550 nm to which said photostimulable phosphor after storing therein the energy of said penetrating radiation is exposed, (3) a detection means for detecting fluorescent light emitted from the photostimulable phosphor by irradiation with said stimulating rays, and (4) an erasure means for erasing energy left in said phosphor after said detection, wherein said means is a light source or plurality of light sources capable of emitting light mainly within the 370 to 530 nm range containing two distinct or separate emission bands, one of which is peaking at or near 400 nm and the other at or near 500 nm.

12. Apparatus according to claim 11, wherein the erasure means emits light in the 370 to 530 nm range being composed such that the ultraviolet light emitted in the 370–400 nm range is less than 50% of the energy emitted as visible light in the 400–500 nm range.

13. Apparatus according to claim 12, wherein said erasure means is an erasure source containing an ultraviolet-stimulable fluorescent means in conjunction with an ultraviolet radiation emitting means.

* * * * *